US010316744B2

(12) United States Patent
Fluhler

(10) Patent No.: US 10,316,744 B2
(45) Date of Patent: Jun. 11, 2019

(54) HYPOCYCLOIDAL METHODS AND DESIGNS FOR INCREASING EFFICIENCY IN ENGINES

(71) Applicant: Herbert U Fluhler, Huntsville, AL (US)

(72) Inventor: Herbert U Fluhler, Huntsville, AL (US)

( * ) Notice: Subject to any disclaimer, the term of this patent is extended or adjusted under 35 U.S.C. 154(b) by 137 days.

(21) Appl. No.: 15/438,696

(22) Filed: Feb. 21, 2017

(65) Prior Publication Data

US 2017/0159560 A1 Jun. 8, 2017

Related U.S. Application Data

(63) Continuation-in-part of application No. 14/078,072, filed on Nov. 12, 2013, now Pat. No. 9,574,502, which is a continuation of application No. 12/398,182, filed on Mar. 5, 2009, now Pat. No. 8,578,695.

(Continued)

(51) Int. Cl.

| | |
|---|---|
| ***F02B 75/32*** | (2006.01) |
| ***F01B 9/04*** | (2006.01) |
| ***F02B 41/04*** | (2006.01) |
| ***F02G 3/00*** | (2006.01) |
| ***F16H 21/36*** | (2006.01) |
| ***F16H 37/12*** | (2006.01) |
| ***F02D 15/02*** | (2006.01) |
| ***F02D 15/00*** | (2006.01) |

(Continued)

(52) U.S. Cl.

CPC .............. *F02B 75/32* (2013.01); *F01B 9/042* (2013.01); *F02B 41/04* (2013.01); *F02D 15/00* (2013.01); *F02D 15/02* (2013.01); *F02G 3/00* (2013.01); *F16H 21/365* (2013.01); *F16H 37/124* (2013.01); *F01B 2009/045* (2013.01); *F02B 53/00* (2013.01); *F02B 2075/027* (2013.01); *Y02T 10/12* (2013.01); *Y02T 10/14* (2013.01)

(58) Field of Classification Search

CPC ........ F02B 75/32; F02B 75/02; F02B 75/045; F02B 2075/027; F02B 41/04; F16H 21/365; F16H 37/124; F02D 15/00; F02D 15/02; F01B 9/026; F01B 9/042; F02G 3/00

USPC ............................................. 74/52; 123/55.7

See application file for complete search history.

(56) References Cited

U.S. PATENT DOCUMENTS 3,290,950 A * 12/1966 Carlson ................ F16H 21/365 123/55.7

4,803,890 A * 2/1989 Giuliani ................. F01B 9/023 123/197.4

(Continued)

*Primary Examiner* — Hoang M Nguyen

(74) *Attorney, Agent, or Firm* — Patent Grove LLC; Tomas Friend

(57) ABSTRACT

A high efficiency reciprocating engine, nominally of the internal combustion type but alternatively of the external combustion type is disclosed. The new engine uses Hypocycloidal and alternatively Epicycloidal gear mechanisms to create differentiated compression and expansion ratios which then promote significant improvements in efficiency through lower compression losses and higher extraction of available energy. Through suitable augmentation, the engines can be made to provide higher power when needed over higher efficiency. Additionally, other parameter modifications enable realization of low side wall loads and true zero exhaust volume.

7 Claims, 10 Drawing Sheets

Related U.S. Application Data

(60) Provisional application No. 61/190,982, filed on Sep. 4, 2008, provisional application No. 61/134,324, filed on Jul. 9, 2008.

(51) Int. Cl.

| | |
|---|---|
| *F02B 75/02* | (2006.01) |
| *F02B 53/00* | (2006.01) |

(56) References Cited

U.S. PATENT DOCUMENTS

| | | | | |
|---|---|---|---|---|
| 5,937,962 | A * | 8/1999 | Yokoyama | B62M 6/10 180/205.4 |
| 6,209,495 | B1 * | 4/2001 | Warren | F01B 9/026 123/197.4 |
| 6,240,885 | B1 * | 6/2001 | Hanson | F02B 61/045 123/55.2 |
| 8,281,763 | B2 * | 10/2012 | Namikoshi | F01B 1/08 123/193.6 |

* cited by examiner

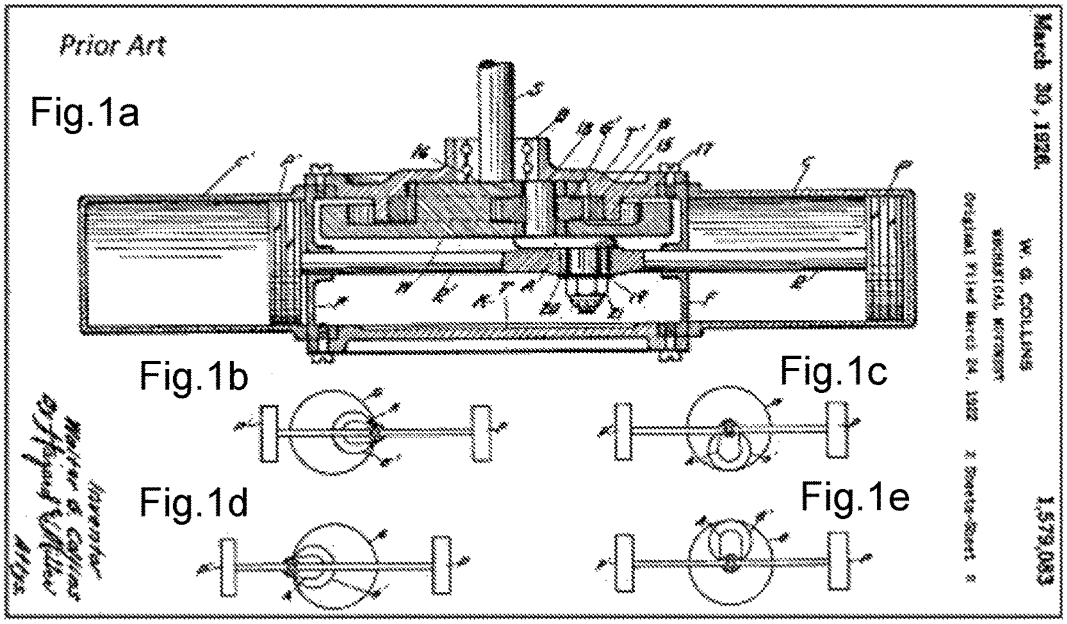
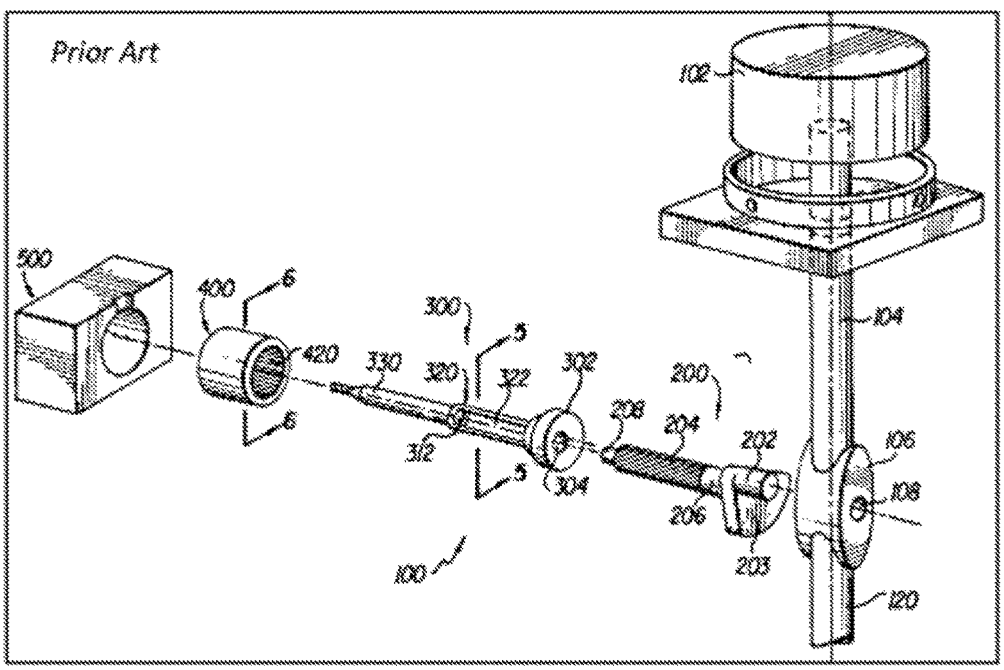
Fig. 2

0 DEGREES - TOP

90 DEGREES - POWER STROKE

180 DEGREES - BOTTOM STROKE

270 DEGREES - UP STROKE

TDC
Intake
TDC
Compression

BDC
Intake
BDC
Power
1100
Trace

HYPOCYCLOIDAL METHODS AND DESIGNS FOR INCREASING EFFICIENCY IN ENGINES

CROSS REFERENCE TO RELATED APPLICATION

This application is a Continuation In Part of Applicant's U.S. patent application Ser. No. 14/078,072, filed Nov. 12, 2013, which is a continuation of Applicant's patent application Ser. No. 12/398,182, filed Mar. 5, 2009, which issued as U.S. Pat. No. 8,578,695 on Nov. 12, 2013, which in turn claims the benefit of Applicant's provisional applications No. 61/190,982, filed Sep. 4, 2008 and 61/134,324, filed Jul. 9, 2008. Application Ser. No. 14/078,072, U.S. Pat. No. 8,578,695 and provisional application Nos. 61/190,982 and 61/134,324 are all incorporated herein in their entireties by reference.

STATEMENT REGARDING FEDERALLY FUNDED DEVELOPMENT

This invention was not made with any Federal Government support.

FIELD OF THE INVENTION

This invention relates generally to heat engines, and particularly to a Hypocycloidal engine to instantiate a thermodynamic cycle modifications resulting in higher (potentially significantly higher) thermal efficiencies than realized in Otto and Diesel class engine designs.

BACKGROUND OF THE INVENTION

Applicant's U.S. Pat. No. 8,578,695 teaches a fairly broad set of methods and top level designs for realizing engines with significantly higher efficiencies. A central result of that work is that to maximize efficiency, the power needed from the engine for the Compression cycle of an engine must be minimized. This is because the use of compression power effectively double charges the efficiency account: first by the obvious reduction of engine output by redirecting the needed compression power to the compression work of the compression cycle, but then too by that work, needing to have been produced by the engine, must thereby be produced with the penalty of the efficiency of the engine. So by example, if an engine produces a watt of power with 50% efficiency (which by the way is a very high efficiency like we are striving to attain from this invention) then that 1 watt of power was produced at the cost of 2 watts of heat input (fuel) meaning that both the compressive power is lost to the output plus an additional watt of heat input (fuel) was used above and beyond the 1 watt needed just to replace the 1 watt of compression power. This means the engine gets charged essentially twice for the compression cycle power need to run the engine, thereby significantly decreasing net efficiency.

In this specification, we will seek to disclose more detailed means for improving the efficiency of internal and external combustion engines through the use of hypocycloid mechanisms that can reduce the above referenced compression work when high power levels are not needed. For most engine applications this is the case most of the time, as vehicles tend to operate most of their time at moderate and steady loads, and the same hold true of ships and generators. However, since engines might need bursts of power periodically, the disclosed methods also can be augmented to increase the power while potentially also increase efficiency most of the time. The primary objective of this invention then is to reveal means for the practical employment of hypocycloidal mechanisms for increasing efficiency of engines.

FIGS. 1*a*-1*e* show the key descriptive figure from U.S. Pat. No. 1,579,083 issued in 1926 and is one of the older or perhaps oldest patents teaching the use of hypocycloidal gears in drive trains for internal combustion engines. However, as with all other types of prior mechanisms, it uses the easiest and lowest ratio hypocycloidal gear system with a 2:1 ratio. As can be seen in the subordinate original figures, this mechanism provides an admittedly desirable pure motion of the piston rod in-line with the cylinder axis which minimizes cylinder sidewall friction through the whole cycle. However there is no difference between the compression ratio or the expansion ratio in an engine driven with such a mechanism, and although there is a small performance and efficiency improvement from this design, it is not a large improvement.

A more refined mechanical instantiation of essentially the same basic design is shown in FIG. 2 from U.S. Pat. No. 6,510,831 B2 issued in 2003. This invention uses exactly the same hypocycloidal gear design and 2:1 ratio as shown in FIG. 1, but improves upon this with a clever integration of flat bearings to relieve the piston loads off the gears, which are less suitable for this type of reciprocating punishment. We will want to use a similar bearing design in the proposed invention for the same purpose, but will not be using the same 2:1 hypocycloidal gear ratio.

More recently, a two cylinder diametrically opposed engine with a hypocycloidal drive mechanism is described in U.S. Applicant 2010/0031916A1. This design is not unlike others (including U.S. Pat. No. 1,569,083) but differs in offering a more pragmatic mechanism that like U.S. Pat. No. 6,510,831 B2 offloads the main load from the gears onto flat bearings proven to withstand the repetitive pounding of reciprocating engines. However, once again, only a 2:1 ratio hypocycloidal gearing design is used, and all attention is given to the inline motion of the crank shaft to reduce friction between the piston and the cylinder.

U.S. Pat. No. 3,791,227 is interesting in the context of the present invention as the mechanical elements therein are similar as to what might be contemplated for instantiating the present invention in order to provide for a robust strong design. However, the entire purpose of U.S. Pat. No. 3,791, 227 is for the balancing of the engine, with no thought or consideration given to the possibility of a compression versus expansion differential or other means for efficiency enhancement.

FIGS. 3*a*-3*d* from U.S. Pat. No. 6,510,831 B2 illustrate the in-line motion produced by the above inventions and all such inventions that might employ a 2:1 hypocycloidal gear ratio. Although it is enviable to provide such in-line motion, it appears this friction source was over emphasized at one time in the recent past. It absolutely is a factor, but with modern lubrication technology, it is not a key driver of engine efficiency. For example the new Honda Exlink Atkinson Linkage engine has a reduced in-line angle during the power stroke (where it really matters) but the other strokes (intake, compression and exhaust) of this engine have a larger in-line angle like most any other simple crack based engine. Therefore, although a small in-line angle may be of some importance during the power stroke when the forces are greatest, it is not a prerequisite for an efficient or usefully powerful engine at all times.

BRIEF DESCRIPTION OF THE DRAWINGS

FIGS. 1*a*-1*e* are taken from U.S. Pat. No. 1,579,083 and show a prior art use of 2:1 ratio Hypocycloidal mechanisms in internal or external combustion engines (hereafter just "engine" or "engines"), primarily for the purpose of creating completely linear motion, and thereby minimizing cylinder side loading forces common with traditional crank based reciprocating engines.

FIG. 2 is taken from U.S. Pat. No. 6,510,831 and shows another example of essentially a very similar 2:1 ratio Hypocycloidal mechanism but much better integrated mechanically into the engine to provide off-loading of forces from the gears to smooth/flat bearings which are much better able to handle such loads.

DETAILED DESCRIPTION OF THE DRAWINGS

Figure 3A:
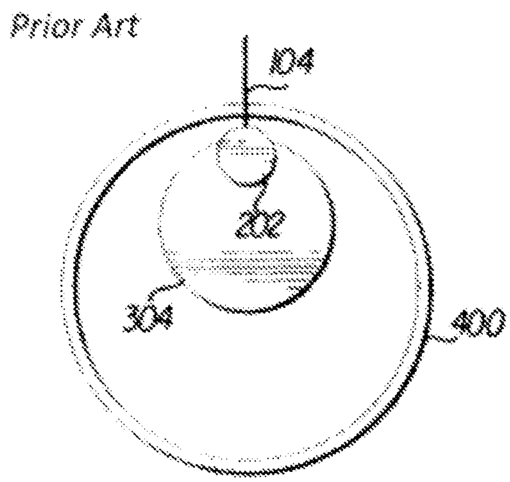
FIGS. 3*a*-3*d* show the motion mechanics of the 2:1 Hypocycloidal mechanism in FIG. 2 with the linear (vertical) piston rod showing as the darker upward pointing line going to the piston.
Figure 3B:
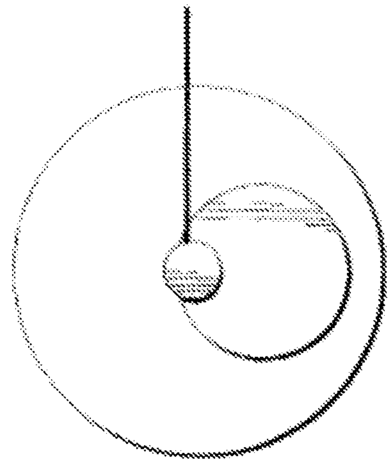
Figure 3C:
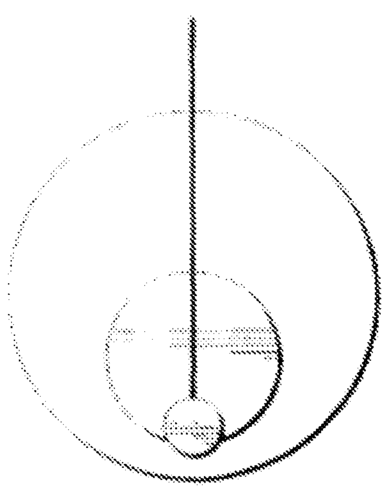
Figure 3D:
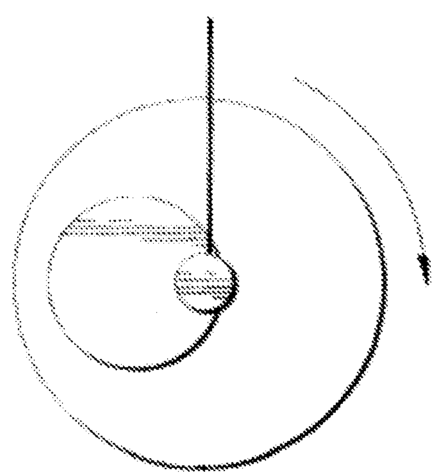
Figure 4:
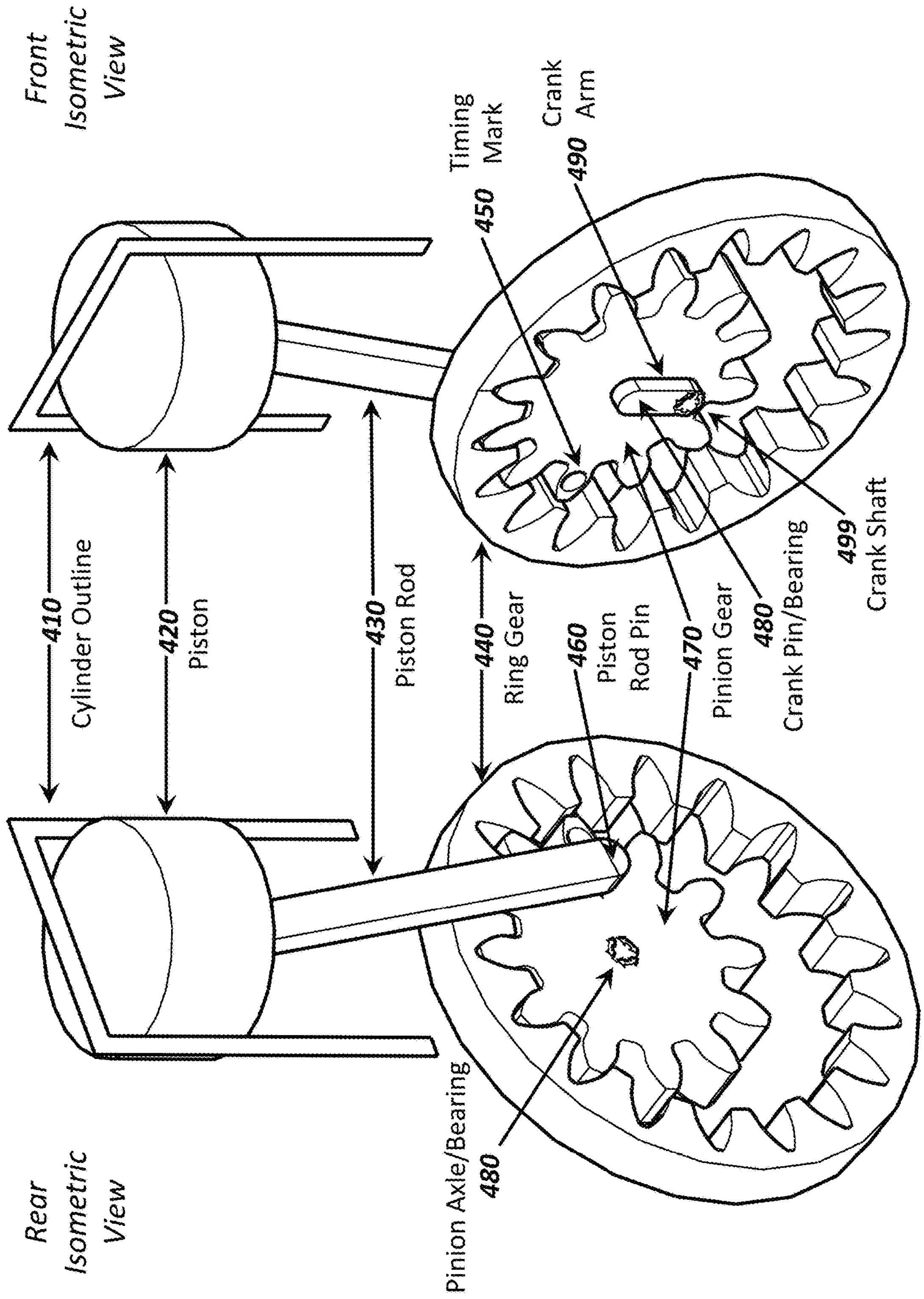
FIG. 4 shows a representative example lower order 3:2 ratio Hypocycloidal gearing based on the current invention.

FIG. 4 shows the isometric and reverse isometric views of an exemplary simple model of the engine main drive mechanism of a one cylinder engine according to the teachings of the parent application, and the teachings of the instant invention. A first observation is that the ratio employed here is not the traditional 2:1 ratio hypocycloidal gear system, but one with a lower ratio, here selected to be 3:2: that is, the circumference and associated number of teeth in the circumferential ring gear of the hypocycloidal pair is 1.5 times the circumference and associated number of gears of the smaller pinion gear.

In FIG. 4, 410, 420, and 430 are a reasonably traditional Cylinder, Piston and Piston Rod components, respectively, not unlike found in traditional internal combustion engines, although certain engineering and design aspects might be adjusted and optimized to best adapt to and take advantage of the new hypocycloid mechanism that transfers power to a crankshaft 499. The new hypocycloid mechanism comprises an internally toothed Ring Gear 440; an externally toothed Pinion Gear 470 that orbits and runs inside the Ring Gear 440; a Piston Rod Pin bearing 460 that connects the Piston Rod 430 to the Rod To Pinion Gear 470 in a manner not unlike the connection to the crank pin in a conventional internal combustion engine; A Timing Mark 450 on the Pinion is provided for installation alignment and clarity of operation herein; a Pinion Axle and Bearing 480 that permits the Pinion Gear 470 to rotate freely with respect to the Crank Arm 490; and finally the crank shaft 499 that rotates constrained to the crank shaft bearings in the motor block and extracts power from the engine.

Figure 5:
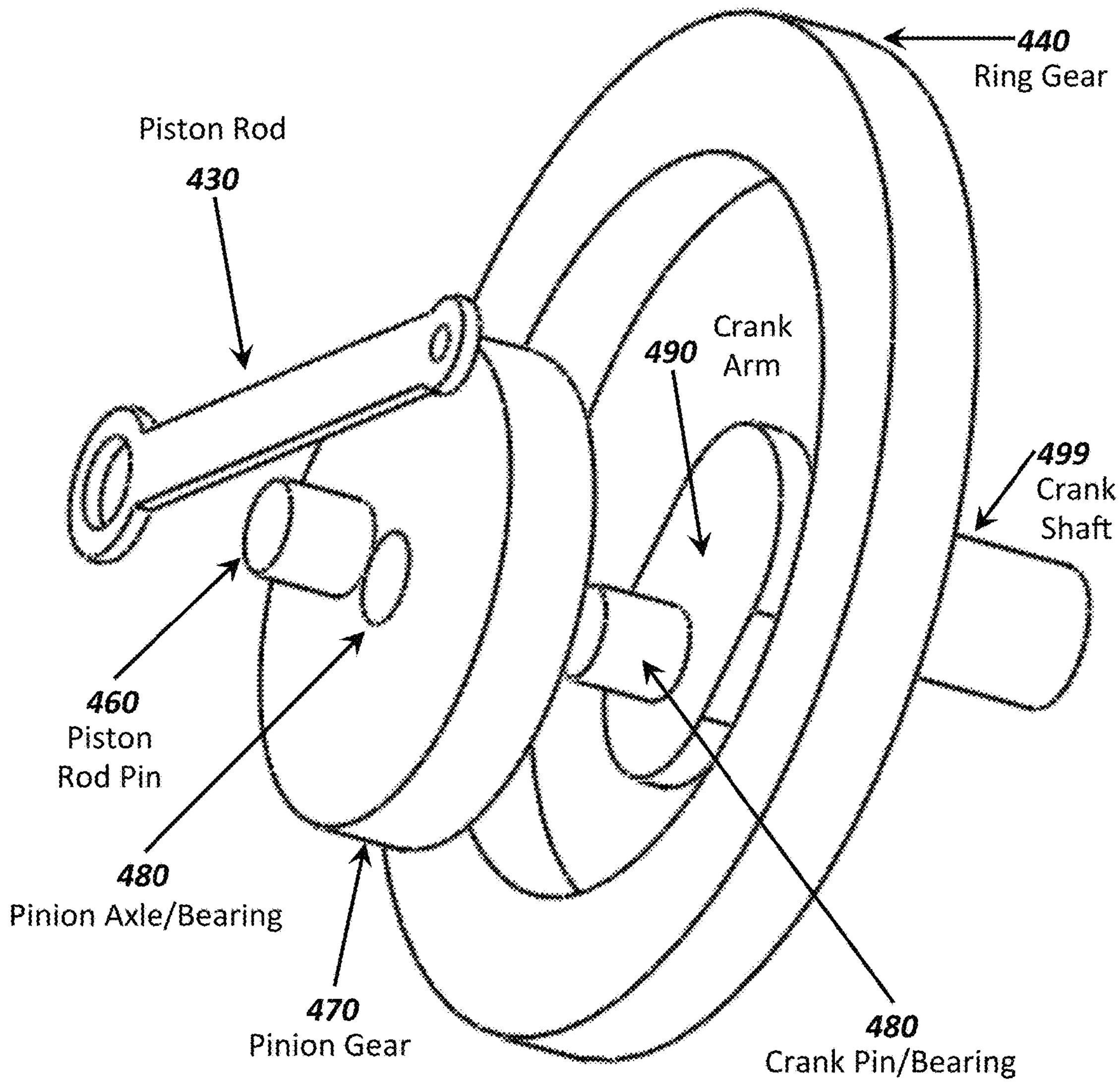
FIG. 5 is an exploded view of the mechanism of FIG. 4 showing all the hidden parts not readily visible.

FIG. 5 shows an exploded view of the hypocycloid mechanism including all the same parts described in reference to FIG. 4. Here, it is seen that pinion 470 is centrally mounted to crank pin 480, in turn fixed to a crankshaft arm 490. Arm 490 is fixed in offset relation to crankshaft 499. The offset relation of arm 490 allows pinion 470 to rotate within ring gear 440. As should be apparent, ring gear 440 is fixed within the crankcase of the engine.

Figure 6:
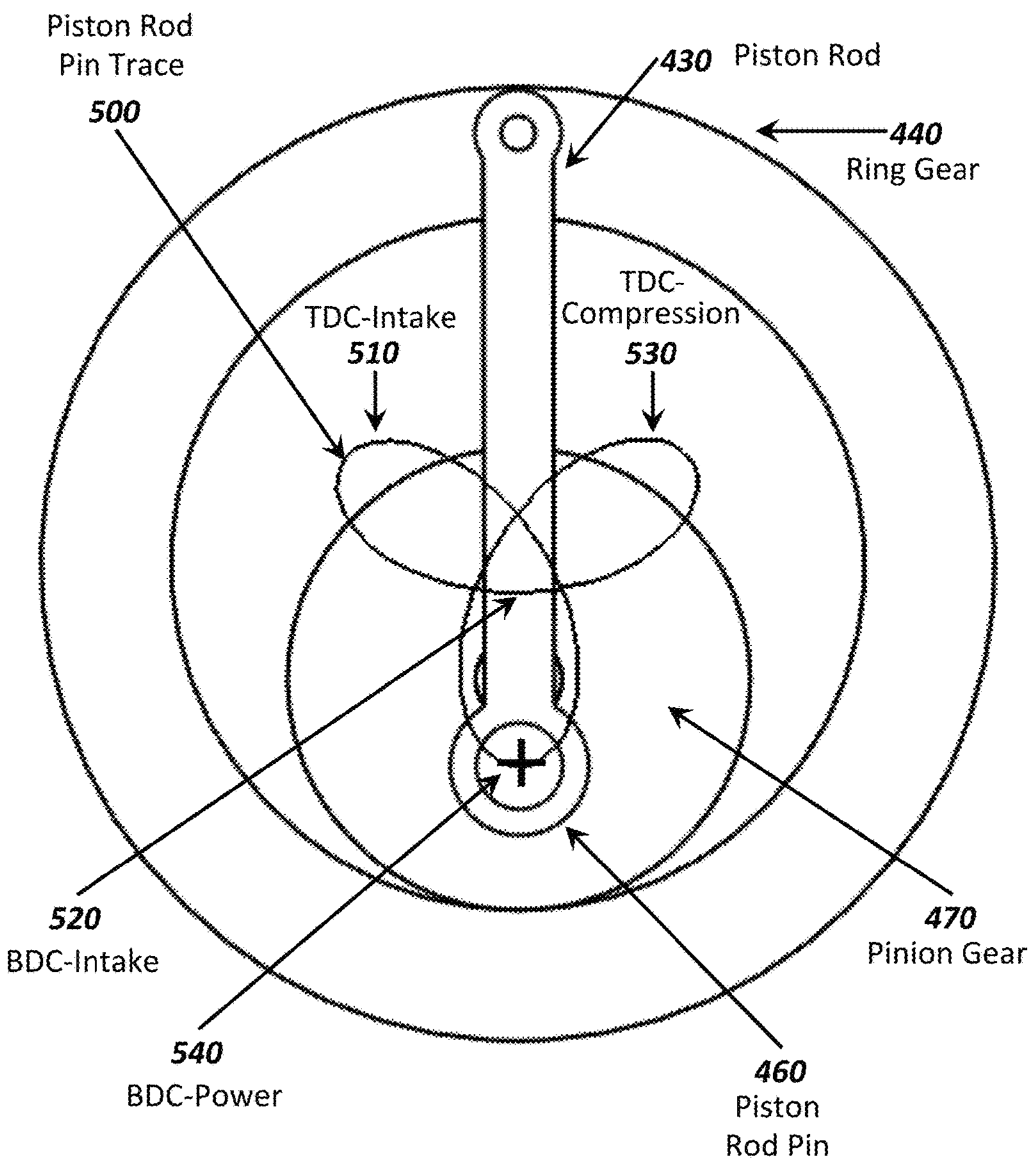
FIG. 6 shows a diagrammatic view of FIG. 5 also showing the trace in space of the Piston Rod Pin, which via its connectivity with the Piston, dictates the motion of the piston and its instantiation of the thermodynamic cycles in the engine.
Figure 7A:
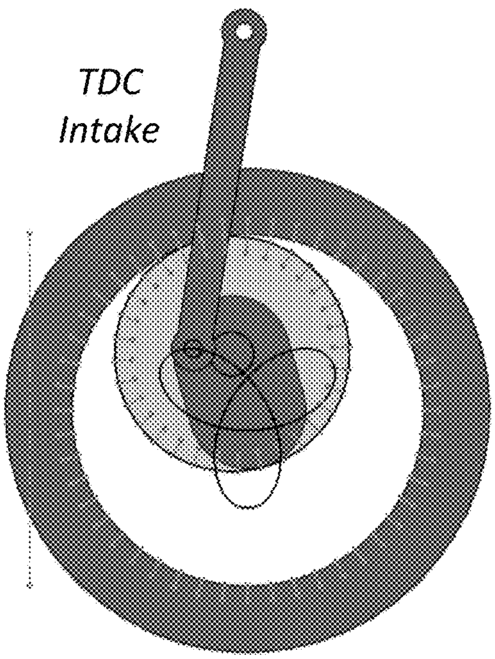
FIGS. 7A-7D are diagrammatic views show the motion of the constituent gear parts of the mechanism shown in FIG. 6, along with a trace of the Piston Rod Pin.
Figure 7B:
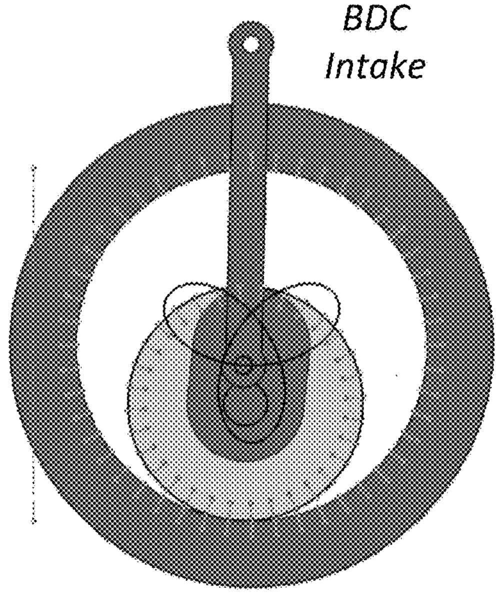
Figure 7C:
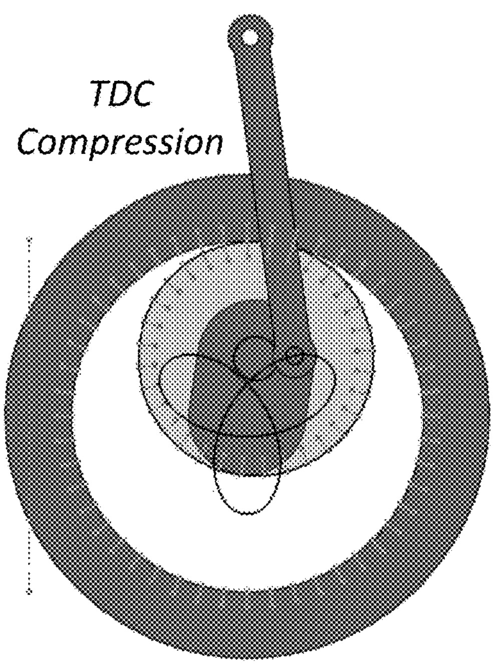
Figure 7D:
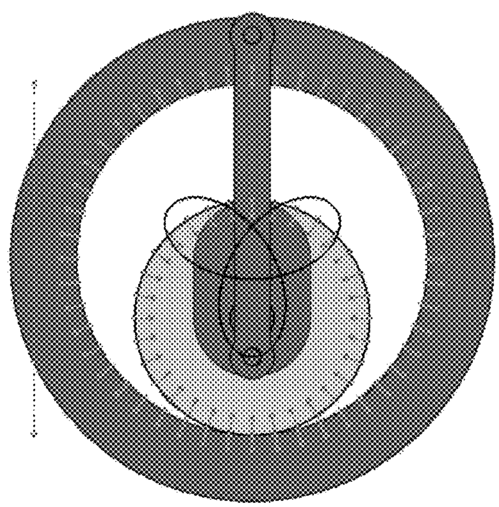
Figure 8A:
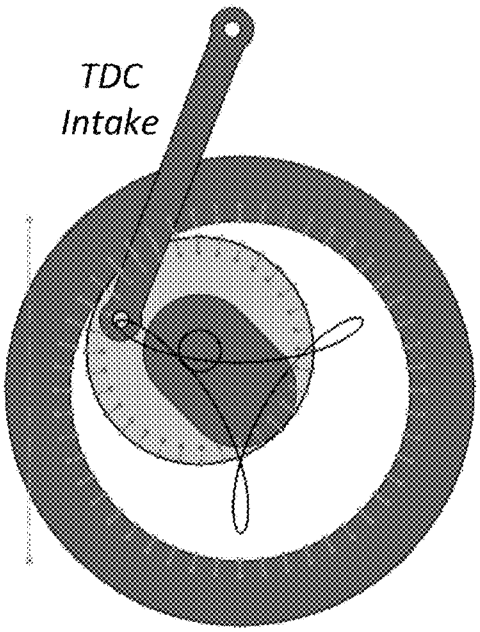
FIGS. 8A-8D is a diagrammatic view showing the same type of information as FIGS. 7A-7D, but employ a different "Lever Arm" in the connection geometry of the Piston Rod Pin to the Pinion Gear.
Figure 8B:
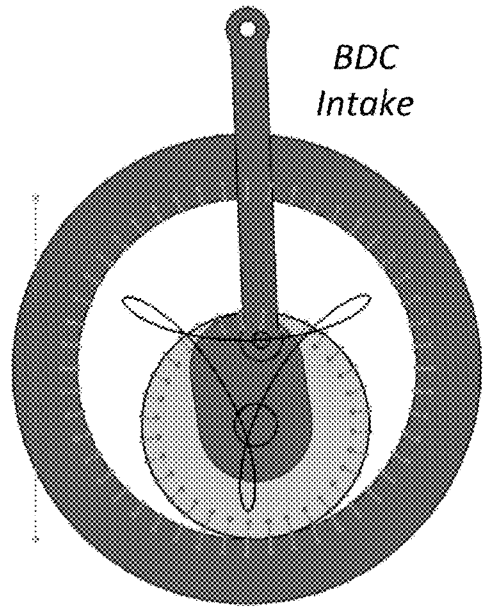
Figure 8C:
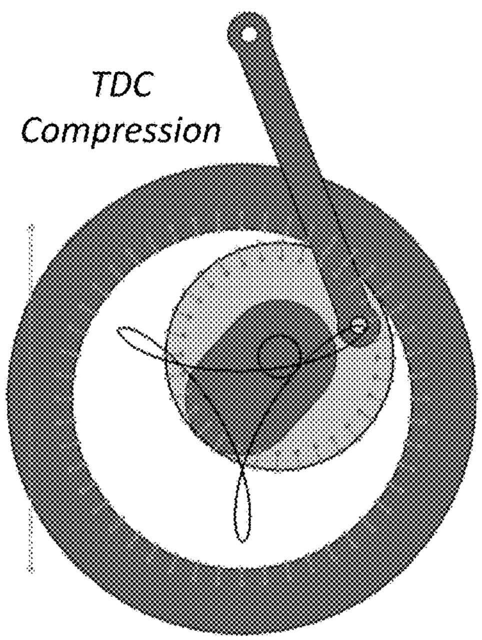
Figure 8D:
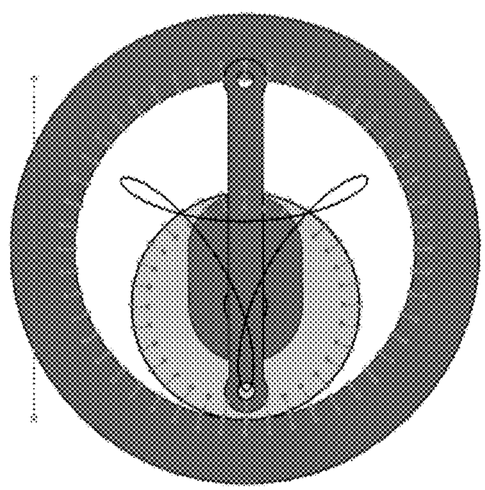

FIG. 6 shows the mechanism near Bottom Dead Center (BDC) at the end of the Power Stroke. The figure also illustrates the Trace 500 of the Piston Rod Pin 460 in space referenced to the engine block and cylinder. As can be seen, the trace of the Piston Rod Pin manifests a total of four vertical motion inflection points comprising two separate Top Dead Centers (TDC) and two separate Bottom Dead Centers (BDC). Because of the direct connection to the Piston Rod, these four inflection points have direct motion authority of the piston. Beginning at TDC for the Intake Stroke at 510 and moving in a generally counter clockwise direction, the Piston Rod Pin (and hence Piston) will move downward until reaching the BDC for the Intake Stroke at 520.

Note that this vertical displacement from 510 to 520 is notably less by about half that the distance to the BDC of the Power stroke at 540, thereby indicating that the piston throw for the Intake Stroke will be about half the piston throw for the Power Stroke. This means that, for a normally aspirated engine, less fuel-oxidizer mixture (Otto-type cycle) or air/oxidizer (Diesel-type cycle) will be admitted into the cylinder on a volume basis. This is what is required in order to achieve maximum efficiency, because any excess intake must be worked on by the engine during the compression phase of the cycle, and this compression work exacts a double penalty on efficiency since it requires the engine to produce that compression power (at its limited efficiency) to then apply the compression work which again degrades power and hence efficiency.

Whereas it is an objective of the current invention to limit the admitted intake volume in order to increase efficiency, this obviously cannot be taken too far, for if the engine admitted zero intake volume, then it might be maximally efficient, but it would not produce any useful power. Therefore, for a given set of application requirements, there will be some design optimum which optimizes efficiency while still producing useful amounts of power. Note however that this power deficiency can be adaptively addressed with the use of a turbo charger or supercharger to boost the intake pressure when power is needed over efficiency. In some embodiments, since the volume of the intake is smaller, then too will be the compression ratio, and thereby, a significant amount of Turbo Boost may be used without fear of predetonation. Effectively then we may make a high efficiency engine with small intake volume and associated low compression ratio, but then dynamically increase the effective intake volume by an on demand Boost. In this way this engine can provide high efficiency and also provide adequate power when needed at the temporary expense of efficiency. In other embodiments, a cylinder head may be configured with a smaller volume in order to increase a compression ratio of the engine to 10:1 or even greater for a gasoline engine. In any case, such an engine would have a power or expansion stroke that is about twice as long as an intake stroke in order to allow for greater expansion of hot and burning gasses.

Note also that the specific locations of all the 500 series trace points is dictated by the explicit geometric dimensions of the Hypocycloid dimensions and the angles between the comprising parts. A great deal of flexibility is afforded to the designer by these degrees of freedom to fully optimize the design for achieving maximum efficiency or meeting other performance or requirements metrics of interest.

Continuing through the phases of FIG. 6, once the intake stroke is completed at 520, a compression stroke occurs until hitting TDC again at 530. Again note that if the intake volume is low, then the compression work will be low compared to the power stroke and hence this loss to efficiency is much reduced. Note also that since the intake stroke did not have to work hard to admit its limited intake volume, and concomitantly since the compression stroke did not have to work hard to compress the limited intake volume, there are low loads on the piston as compared to a conventional engine. Although the piston angles are highest at 510 and 530, since these loads are low, there is not a large cylinder-piston friction penalty during these phases. Also, a length of the Piston Rod may be lengthened, and as will be seen shortly, other geometries may be adjusted to mitigate potential friction impacts.

At 530 in FIG. 6 the fuel is ignited and the path moves to 540 for the BDC of the Power Stroke. Although the Trace at 530 suggests a notable Piston Rod angle to the Crank Shaft, this is a bit deceiving in that its not much larger than a normal Crank Arm distance. But more importantly, what cannot be seen in these static figures is that the speed along the downward path of trace 530 results in an accelerating downward piston motion, meaning that the mechanism works to rapidly accommodate the expansion of the Power Stroke. For the most part of the Power Stroke the forces are almost straight downward. Therefore any side forces of the Piston in the Cylinder are fleeting and less of an issue.

After the BDC of the Power Stroke at 540, the Piston is forced up again to help Exhaust the Cylinder until reaching TDC for Intake at 510 to repeat the cycle. The move up to 510 results in the Piston slowing down more than in a traditional sinusoidal cycle, which means there is more time to exhaust the cylinder, lowering residual pressure for a further increase in efficiency.

So to summarize the performance attributes of the new invention, it first manifests a smaller intake volume than a traditional piston crank engine of the same Crank Arm length which reduces friction of the required Intake power which must be provided by the engine. It next also, and for the same reasons, reduces the Compression power which must be provided by the engine. Both these powers, since they are produced by the engine at some efficiency (usually about 25-50%) incur a double penalty to the engine efficiency not only because they are directly removed from the available engine power, but also because they required expenditure of (1−e) more fuel to produce these powers, where "e" is the efficiency of the engine. Continuing, there is a further increase in efficiency (and a power advantage) from the longer Power Stroke than is available from a traditional piston crank engine of the same Crank Arm length. This is sometimes called an "Over Expanded" engine stroke, but here it is simply inherent in the design and the selection of design parameters. Since the Power Stroke is longer than both the Intake stroke and Compression Stroke that would be achieved with a traditional piston crank engine of the same Crank Arm length, there is a notable increase in efficiency from this attribute of the invention. Finally, there is the factor that there is more time available for the exhaust stroke to empty the cylinder more effectively during the Exhaust Stroke. Exhaust scavenging could also assist in evacuating the cylinder in an optimum RPM range. Based on these factors and the particular aspects of the design, efficiencies approaching twice that of the Otto cycle might be achievable. As such, it is believed that efficiencies of 50% or better are achievable. Similar findings may be found for the Diesel cycle albeit likely less improvement since the Diesel is naturally more efficient to begin with.

FIGS. 7A-7D show exemplary states as labeled for an engine of the new invention with a small distance between the Piston Pin and the Pinion Shaft of a quarter inch for a small garden tool engine wherein the relations of the engine design parameters result in an compression ratio that is about half the expansion ratio. This distance between the Piston Pin and the Pinion Shaft we term the Lever Arm of the Hypocycloidal mechanism because it leverages the ratio of the expansion ratio to the compression ratio. Note that the portion of the lever arm opposite the crankshaft connection serves as a counterweight to balance the system.

FIGS. 8A-8D show a like example to FIGS. 7A-7D except that the Lever Arm is twice as large. As can be seen, the Intake Stroke has become very small, so small in fact that this engine would likely not produce enough power to be useful (maybe not enough to stay running). This example illustrates the limits of making the Lever Arm too large. Conversely, if we make the Lever Arm zero length, then the Piston Rod Pin falls squarely on the middle of the Crank Pin, and so this engine mechanism then reduces to the traditional crank and piston engine mechanism in the limit of the Lever Arm going to zero. As such, it is seen that engine efficiencies can be tailored according to anticipated use. Where an engine is used to power a constant load, such as pumping water, a longer lever arm with a shorter intake stroke may be more desirable for increased efficiency. In a variable load application, such as a vehicle, a shorter lever arm may be used to obtain a more powerful engine having a longer intake stroke. However, as noted, providing adjustable or temporary boost to the engine also would serve to adjustably or temporarily increase power.

Obviously then there are parametric sensitivities that impact the exact behavior of the resultant cycle from the hypo cyclic mechanism. And there are certain constraints needed to enforce the geometry. First and foremost, we desire a cycling such that the Pinion Gear is rotated 180 degrees from its starting point after one spin about the Ring Gear and returning to the same starting Crank angle. Since the Pinion needs to rotate an additional half turn in one rotation within the Ring Gear, the Ring Gear needs half again as many teeth as the Pinion Gear, or alternatively the Radius of the Ring Gear (R) needs to be equal to one and half times the radius of the Pinion Gear (r) or, $R=(3/2)*r$. Since the center of the Pinion Gear must always be its radius from the inner perimeter of the Ring Gear, it follows that the Crank Arm radius Rc is given by: $Rc=R-r$. A numeric example (with some tolerance errors) is shown in FIG. 9 for a small engine.

As seen above, R, r and Rc are all related to each other by the necessary geometry to enforce the cycles shown in FIGS. 6, 7 and 8, so effectively they are not really degrees of freedom. What dictates the specific performance for an engine then is the Lever Arm, the angle of the Lever Arm with respect to the in-line axis to the piston center, the Piston Rod length, the associated desired piston stroke (nominally for each stroke type), and the angle of the Cylinder axis to the mechanism axis.

The length of the Piston Rod and its associated desired piston stroke distances are primarily driven by the requirements for the new engine (how big and how much horse power). These in turn drive the size of the Crank Arm, at least as a starting point. Because of the multi-objective nature of these aspects, these and other parameters are best computed with use of an optimizer that can input the appropriate constraints and then search through different combinations of configurations to obtain an optimum for the design requirements. So although we cannot give unitary solution for the selection of the mechanism parameters, we can explore a few relationships between those that can be so defined.

Figure 9:
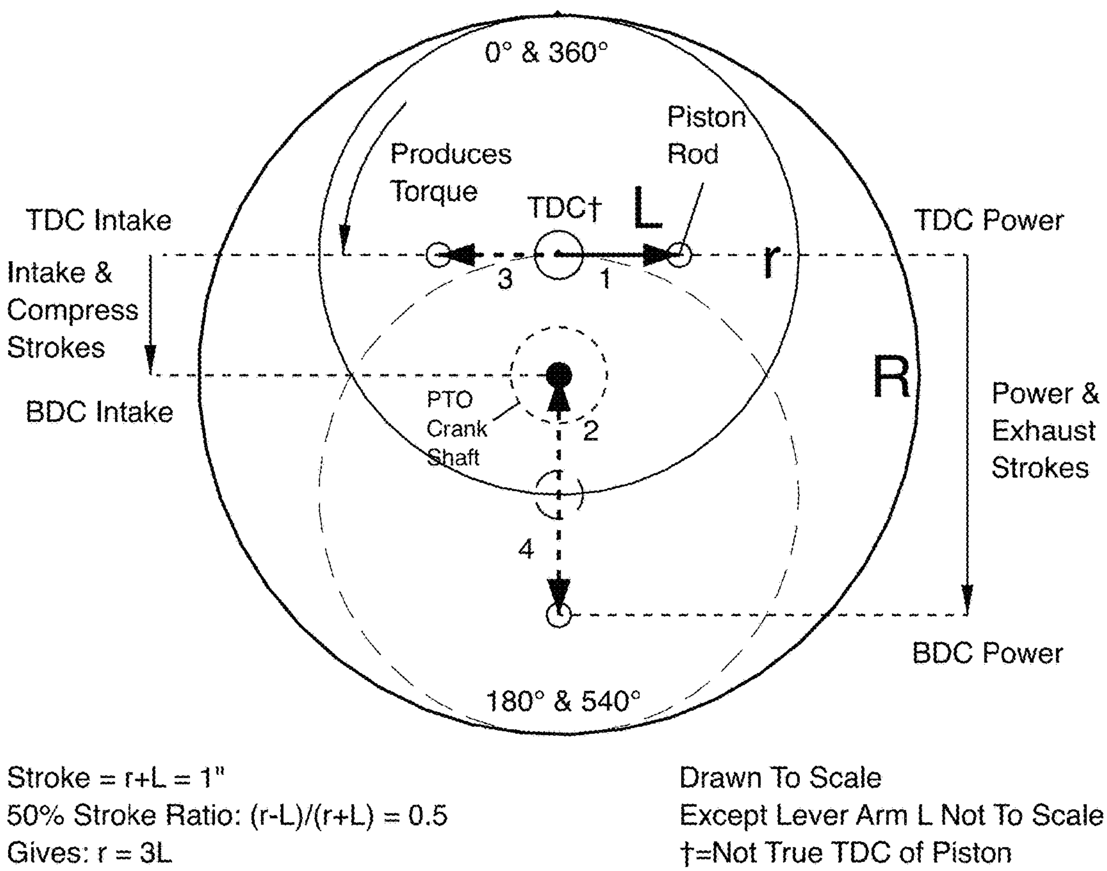
FIG. 9 shows the different constituents of the geometry of the mechanism, and how they inter-relate with each other.
Figure 10A:
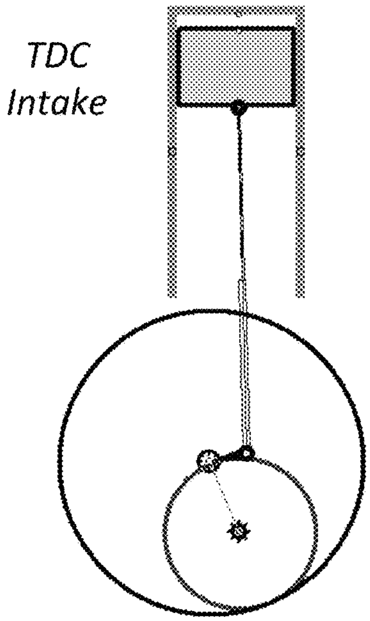
FIG. 10A-10D are diagrammatic views show an alternate Hypocycloidal mechanism.
Figure 10C:
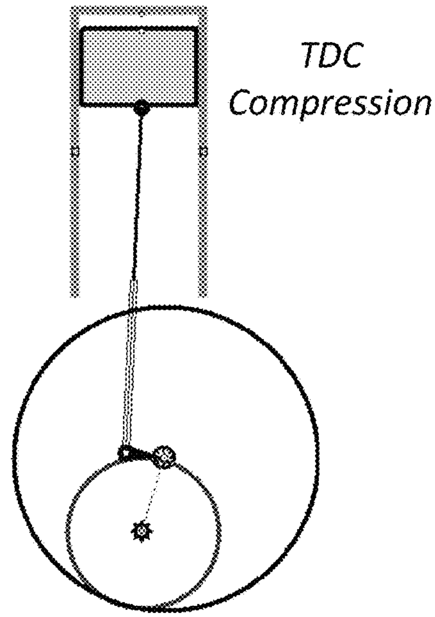
Figure 10B:
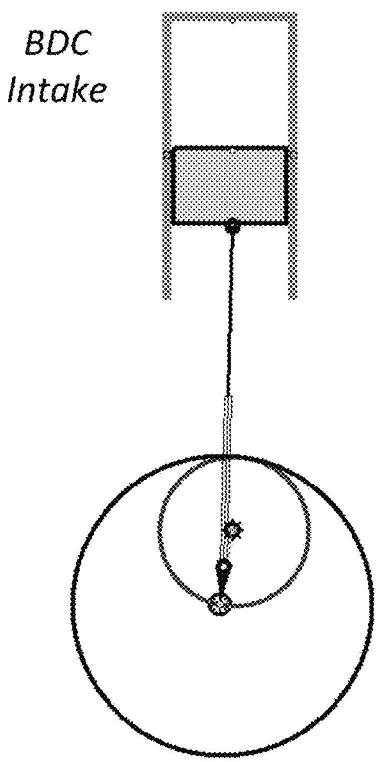
Figure 10D:
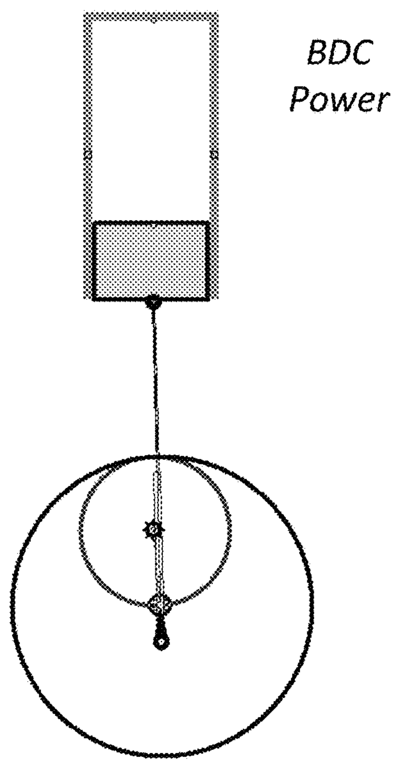
Figures 11A, 11B, 11C, 11D:
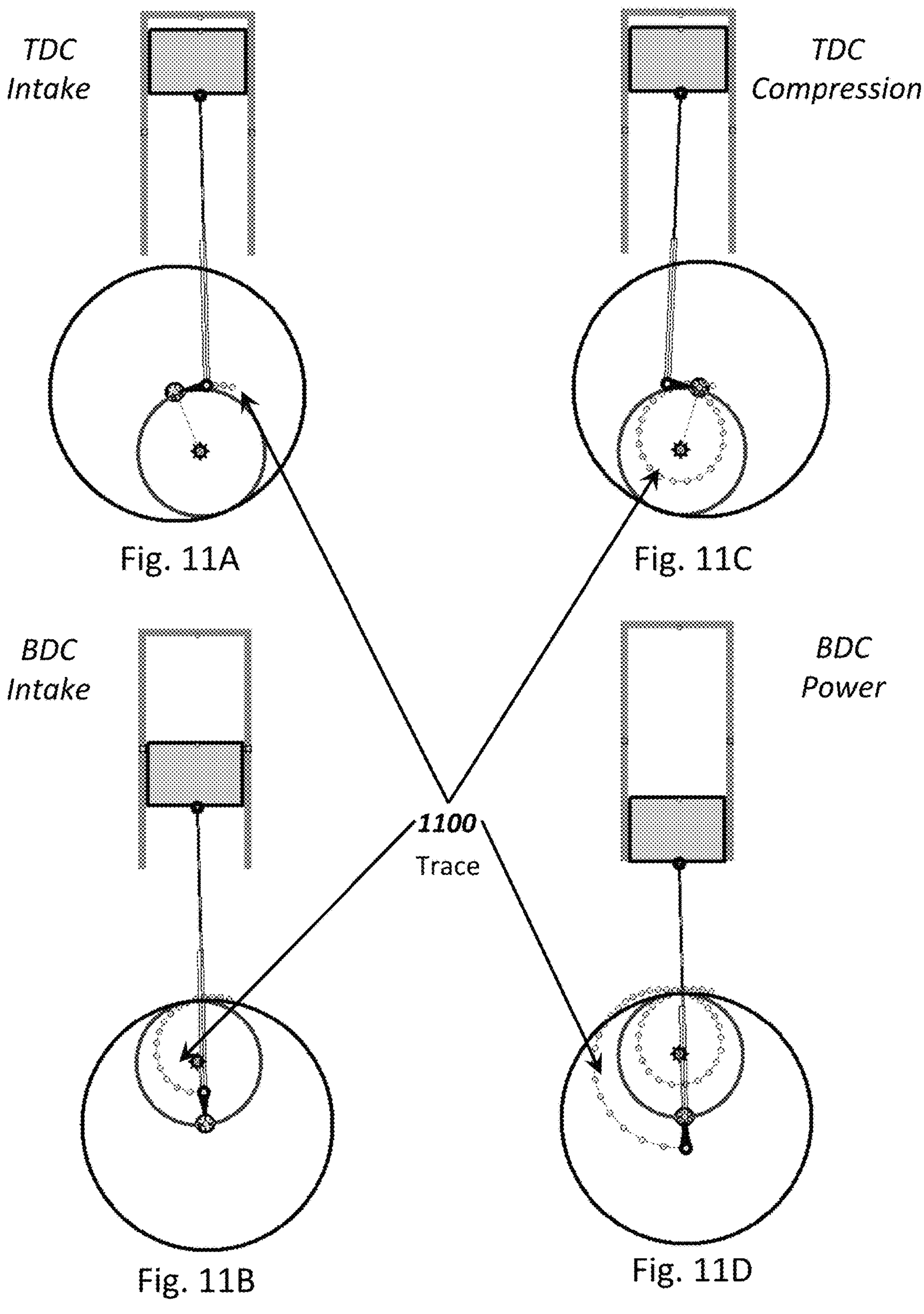
FIG. 11A-11D are diagrammatic views showing the same alternate Hypocycloidal mechanism as FIG. 10A-10D, but also includes a spatial trace of the Piston Rod Pin to suggest resultant Piston motion.

FIG. 9 illustrates some of the parameters already discussed (R and r) as well as the Lever Arm (L) offset of the Piston Rod Pin from the Crank Pin, and their defining equations. Using the geometry of the gears and the linkages, this example shows that for a ratio of the Compression Stroke to the Expansion Stroke of about 50% (0.5) indicates that the Pinion Gear Radius (r) should be equal to 3*L, or L=r/3. That is, if the Lever Arm length is L=r/3, then the ratio of the Compression Stroke to the Expansion Stroke should be about 0.5. Note that the "about" part of this stems from the fact that the real engine will have a Piston Rod Length that has not yet been determined in order to include all the details of its angular trigonometry into the computation. But that would have to be done for a complete instantiated design.

FIG. 9 also shows another aspect which has not been discussed in detail yet, namely the orientation of the Lever Arm together with its length L. As suggested in the figure, the smaller Pinion Gear will rotate about its own axis 90 degrees every half turn of the Crank Shaft, which is centered on the Ring Gear. Therefore it takes four half turns (total of two full turns of the Crank Shaft to effect one rotation of the Lever Arm on the Pinion Gear to return it to its starting position. In order for the Lever Arm to modify the desired stroke profiles, it needs to be pointing substantially up on one of the turns of the Crank Shaft and substantially down on the next turn of the Crank Shaft. To line up with the desired strokes, we find it necessary for the Lever Arm to point about 90 degrees perpendicular from the in-line axis of the cylinder, as shown in FIG. 9, where one can see how the Lever Arm adds to or subtracts from the center Crank Pin bearing of the Pinion Gear when it is located at its lowest position, for the Power and Intake strokes respectively. Alternatively, the Lever Arm can be replaced with an equivalent radial vector emerging from the Crank Pin in an angular direction to the side of the Pinion's Timing Mark as previously disclosed. This is further equivalent to saying that the Piston Pin bearing to the Pinion Gear has a radius and angle offset to provide the desired differential stroke behavior.

Other factors that can be used to adjust and fine tune the mechanism and the strokes is the length of the Piston Rod and the orientation of the Cylinder axis with respect to the mechanism, nominally with respect to the center of the Ring Gear. The length of the Piston Rod is fairly straight forward, being that the longer the Piston rod the smaller the worst case angle of it with respect to the Cylinder axis and thence the lower the side pressure of the piston in the cylinder. Also the Piston Rod must have a minimum length in order to ensure the bottom of the piston clears the Ring Gear.

The angle of the cylinder with respect to the radial to the primary up radial of the Ring Gear can also be used to tweak the strokes and their results. If the Cylinder is tilted with respect to a radial from the center of the Ring Gear, the side forces of the piston inside the cylinder may be managed as needed for optimum capability and performance. Additionally or alternatively, if the Cylinder is displaced angularly about the axis of the Ring Gear, then the two TDC lobes of the trace, 510 and 530 of FIG. 6, are no longer equally distant from the top of the cylinder. This can be used to advantage by arrange this geometry so that there is still some space left in the cylinder for the Compression Stroke volume charge (530 in FIG. 6), but zero volume at TDC of the Exhaust Stroke (the beginning of the Intake Stroke, 510 in FIG. 6) showing a further improvement in pumping efficiency of the engine. A similar effect may be achieved rotating the Lever Arm by an amount on the Pinion and/or offset aligning the Pinion Gear relative to the preferred in-line with cylinder axis. The ability to have a truly zero volume at TDC of the Exhaust Stroke differentiated from a non-zero volume at TDC of the Compression Stroke is a unique feature of the invention.

The hypocyclic gear arrangement shown in the figures to this point are not the only arrangements that can provide substantially similar benefits to those described above. But trades will exist in size and complexity as well as the specific types of gears needed to instantiate the design. FIGS. 10A-10D show a configuration and behavior of a similar arrangement to that described in FIGS. 4-9, but where the roles of the Ring Gear and the Pinion Gear are essentially reversed. That is, instead of the Pinion Gear orbiting inside of a fixed (with respect to the Cylinder) Ring Gear, in FIG. 10 the Pinion Gear has a fixed center shaft and the Ring Gear has a Crank Pin attached to it and it rotates about the Pinion Gear and otherwise takes on its roles and attributes mounting the Lever Arm and Piston Rod Pin, etc. Note that the trace 1100 shown in FIGS. 11A-11D has the same general attributes as the trace in FIGS. 6, 7 and 8, but this time its much smoother with more closely spaced dual TDC lobes. This design may be better for the smoother trace, but is mechanically less satisfactory due to the large ring gear rotating around. Other cycloidal gears can be made to provide similar types of stroke behavior to include Epicycloid versions, but most others tend to be larger in size than the options presented here.

Note however, that the gears themselves need not be very big since their prime function is to retain synchronization between the parts. As long as there are suitable sized flat or other bearings of the proper size to instantiate the desired strokes, the behavior described herein particularly for enhanced efficiency can be realized.

Having thus disclosed my invention and the manner of its use, it should be apparent to those skilled in the relevant arts that incidental changes may be made thereto that fairly fall within the scope of the following appended claims, wherein I claim:

The invention claimed is:

1. A hypocycloidal engine comprising:

a crankshaft having a crank axis;

a crank arm having a first end connected to said crankshaft;

a pinion gear having a pinion axis, said pinion gear rotatably connected to a second, opposite end of said crank arm;

a ring gear within which said pinion gear meshes and circulates around an interior of said ring gear;

a piston rod connected to said pinion in offset relation from said pinion axis;

a piston pivotally connected to said piston rod; and a cylinder within which said piston reciprocates;

wherein an inner circumference of the ring gear is greater than but less than twice an outer circumference of the pinion gear such that a length of an intake stroke of the cylinder is less than a length of a power stroke of the cylinder.

2. The hypocycloidal engine of claim 1, wherein a number of teeth in the inner circumference of the ring gear is greater than but less than twice a number of teeth on the outer circumference of the pinion gear.

3. The hypocycloidal engine of claim 1, further comprising a pinion axle and a pinion bearing that permit the pinion gear to rotate freely with respect to the crank arm.

4. The hypocycloidal engine of claim 1, wherein a ratio of the inner circumference of the ring gear to the outer circumference of the pinion gear is about 10.5:10.0.

5. The hypocycloidal engine of claim 4, wherein the intake stroke of the cylinder is about half the length of the power stroke of the cylinder.

6. The hypocycloidal engine of claim 1, wherein the pinion gear is centrally mounted to a crank pin fixed to the crank arm and said crank arm is fixed in offset relation to the crankshaft and wherein the ring gear is fixed within a crankcase of the engine.

7. The hypocycloidal engine of claim 1, wherein:

the piston rod is connected to the pinion by a piston pin and the piston pin is offset from a pinion shaft by a lever arm distance.

* * * * *